United States Patent
Palmquist et al.

(10) Patent No.: US 9,094,517 B2
(45) Date of Patent: Jul. 28, 2015

(54) METHOD AND APPARATUS FOR SEGMENTING WORK IN A CONTACT CENTER

(75) Inventors: Michael R. Palmquist, Oakland, CA (US); Robert Snyder, Danville, CA (US)

(73) Assignee: Avaya Inc., Basking Ridge, NJ (US)

( * ) Notice: Subject to any disclaimer, the term of this patent is extended or adjusted under 35 U.S.C. 154(b) by 478 days.

(21) Appl. No.: 13/013,392

(22) Filed: Jan. 25, 2011

(65) Prior Publication Data

US 2012/0189115 A1    Jul. 26, 2012

(51) Int. Cl.
*H04M 3/523* (2006.01)
*H04M 3/51* (2006.01)

(52) U.S. Cl.
CPC .......... *H04M 3/5233* (2013.01); *H04M 3/5166* (2013.01); *H04M 2203/402* (2013.01)

(58) Field of Classification Search
CPC ....... H04M 3/51; H04M 3/523; H04M 3/493; H04M 3/5232; H04M 3/527; H04M 2201/42; H04M 2201/60; H04M 3/2227; H04M 3/5233; H04M 2203/2061; H04M 3/42068
USPC ........................... 379/265.01, 265.12, 266.01
See application file for complete search history.

(56) References Cited

U.S. PATENT DOCUMENTS

| | | | |
|---|---|---|---|
| 6,831,966 B1 * | 12/2004 | Tegan et al. | 379/88.16 |
| 6,832,203 B1 * | 12/2004 | Villena et al. | 705/7.14 |
| 7,308,093 B2 | 12/2007 | Annadata et al. | |
| 8,112,391 B2 * | 2/2012 | Allen et al. | 707/624 |
| 2004/0008836 A1 * | 1/2004 | Mani | 379/265.01 |
| 2005/0123124 A1 * | 6/2005 | Collins | 379/265.09 |
| 2007/0201677 A1 * | 8/2007 | Bates et al. | 379/265.01 |

* cited by examiner

*Primary Examiner* — Oleg Asanbayev
(74) *Attorney, Agent, or Firm* — Maldjian Law Group LLC; John Maldjian; William J. Connelly, III

(57) ABSTRACT

Provided herein is a method and system for segmenting work implemented in a contact center server. The method may include: creating a plurality of common skill options; creating a service skill definition tree comprising a plurality of service skill options, wherein each of the plurality of common skill options is associated with the service skill definition tree; receiving a contact from a customer; obtaining a common skill option selection, wherein the common skill option is selected from the plurality of common skill options by the customer; transmitting the plurality of service skill options to the customer, and receiving a service skill option selection from the customer, wherein the service skill option selection is selected from the plurality of service skill options; and segmenting the contact to an agent associated with the common skill option selection and service skill option selection.

16 Claims, 4 Drawing Sheets

METHOD AND APPARATUS FOR SEGMENTING WORK IN A CONTACT CENTER

BACKGROUND

1. Field of the Invention

Embodiments of the present invention generally relate to a method and apparatus for segmenting work in a contact center. More specifically, embodiments of the present invention relate to a method and apparatus for segmenting work in a contact center using skill-based routing and defining skills using a complex data structure.

2. Description of Related Art

Contact centers provide customers with access to contact-handling service agents who provide a variety of services. Contact centers distribute calls, e-mails, messages, multimedia and other types of communications (collectively, "contacts") to available agents in accordance with various predetermined criteria. In existing contact centers, the criteria for handling contacts are often programmable by contact center managers via a capability known as segmenting. Modern contact centers employ "skill-based routing" methodologies to divide received customer contacts into segments known as "skills." Agents are assigned responsibilities to provide service for one or more of these skills. Typically, when the contact center detects that an agent has become available to handle a contact, the contact center identifies the contact-handling skills of the agent, and delivers to the agent, the contact or "work" that matches the agent's highest-priority skill. Skills-based routing allows each agent to be placed into a number of different service categories based on the skill types supported by that agent. Present contact centers define a skill as a single data field representing a segment of work. Agents are assigned to service particular skills.

When configuring existing contact centers, contact center managers typically must define skills within their system to reflect the desired segmentation, as well as create an automated logic process that determines what skill to place a contact into based on its individual attribute values. This configuration process is extremely time-consuming, because all possible skill values and permutations thereof must be stored in a single data field. Developing the definitions of skills, as well as the automated processes by which work assignment systems use to segment the work, requires a substantial amount of development effort, typically handled within the administrative applications. To assist contact center managers in the configuration process, automated tools exist, which can automatically generate every possible permutation of multiple values as a set that can act as a single skill. This is highly problematic, however, because the sheer number of possible permutations makes the solution difficult to use, and due to the inherent relationships between values, many permutations simply do not make sense, or should not be allowed because they break business rules. In some instances, complex segmentation requirements generate millions of possible permutations for skills. The fastest growing market segment of contact centers are the more complex, highly segmented multimedia contact centers. Administration and configuration of these contact centers is becoming more and more complex and time-consuming. This level of complexity is caused because skills are presently saved as a single, flat data field or singe set of values.

Currently, there are no known systems and methods for effectively and efficiently segmenting contacts by defining skills using a complex data structure, rather than a single flat data field or single set of values. Thus, there is a need for systems and methods for effectively and efficiently segmenting contacts by defining skills using a complex data structure.

SUMMARY

Embodiments of the present invention generally relate to a method and apparatus for segmenting work in a contact center. More specifically, embodiments of the present invention relate to the creation of the skills data structures, the logic used to segment work into the skills, as well as the assignment of skills responsibilities to contact center agents.

In one embodiment, a method for segmenting work implemented in a contact center server comprises: creating a plurality of common skill options; creating a service skill definition tree comprising a plurality of service skill options, wherein each of the plurality of common skill options is associated with the service skill definition tree; receiving a contact from a customer; obtaining a common skill option selection, selected from the plurality of common skill options by the customer; transmitting the plurality of service skill options to the customer, and receiving a service skill option selection from the customer, wherein the service skill option selection is selected from the plurality of service skill options; and segmenting the contact to an agent associated with the common skill option selection and service skill option selection.

In some embodiments, obtaining the common skill option selection may include transmitting the plurality of common skill options to the customer in response to the contact, and responsively receiving the common skill option selection, where such common skill option selection is selected from the plurality of common skill options by the customer. Alternatively, obtaining a common skill option selection may include retrieving, from a database, the common skill option selection previously selected from the plurality of common skill options by the customer.

In an alternative embodiments of the present invention, an apparatus for segmenting work in a contact center comprises: an administrative database configured to store a common skill option and a service skill option; a graphical user interface (GUI) for accessing the administrative database and configuring the common skill option and the service skill option; an orchestration system configured to receive a contact from a customer and orchestrate the contact according to a qualification logic; and an assignment engine configured to receive the contact, the common skill option, and the service skill option, and segment the contact to an agent according to an assignment logic.

In an alternative embodiment of the present invention, a communication system comprising: a gateway configured to receive a contact from a customer; an application server configured to receive the contact from the gateway and segment the contact comprising: an administrative database configured to store a common skill option and a service skill option; an administrative graphical user interface (GUI) for accessing the administrative database and configuring the common skill option and the service skill option; an orchestration system configured to receive the contact from the customer and orchestrate the contact according to a qualification logic; and an assignment engine configured to receive the contact, the common skill option, and the service skill option, and segment the contact according to an assignment logic; and a transmitter for transmitting the contact to a destination, wherein the destination is assigned a common skill legal value and a service skill legal value.

BRIEF DESCRIPTION OF THE DRAWINGS

So the manner in which above recited features of the present invention can be understood in detail, a more particular description of embodiments of the present invention, briefly summarized above, may be had by reference to embodiments, several of which are illustrated in the appended drawings.

Figures in the appended drawings, like the detailed description, are examples. As such, the Figures and the detailed description are not to be considered limiting, and other equally effective examples are possible and likely. Furthermore, like reference numerals in the Figures indicate like elements, and wherein.

Figure 1:
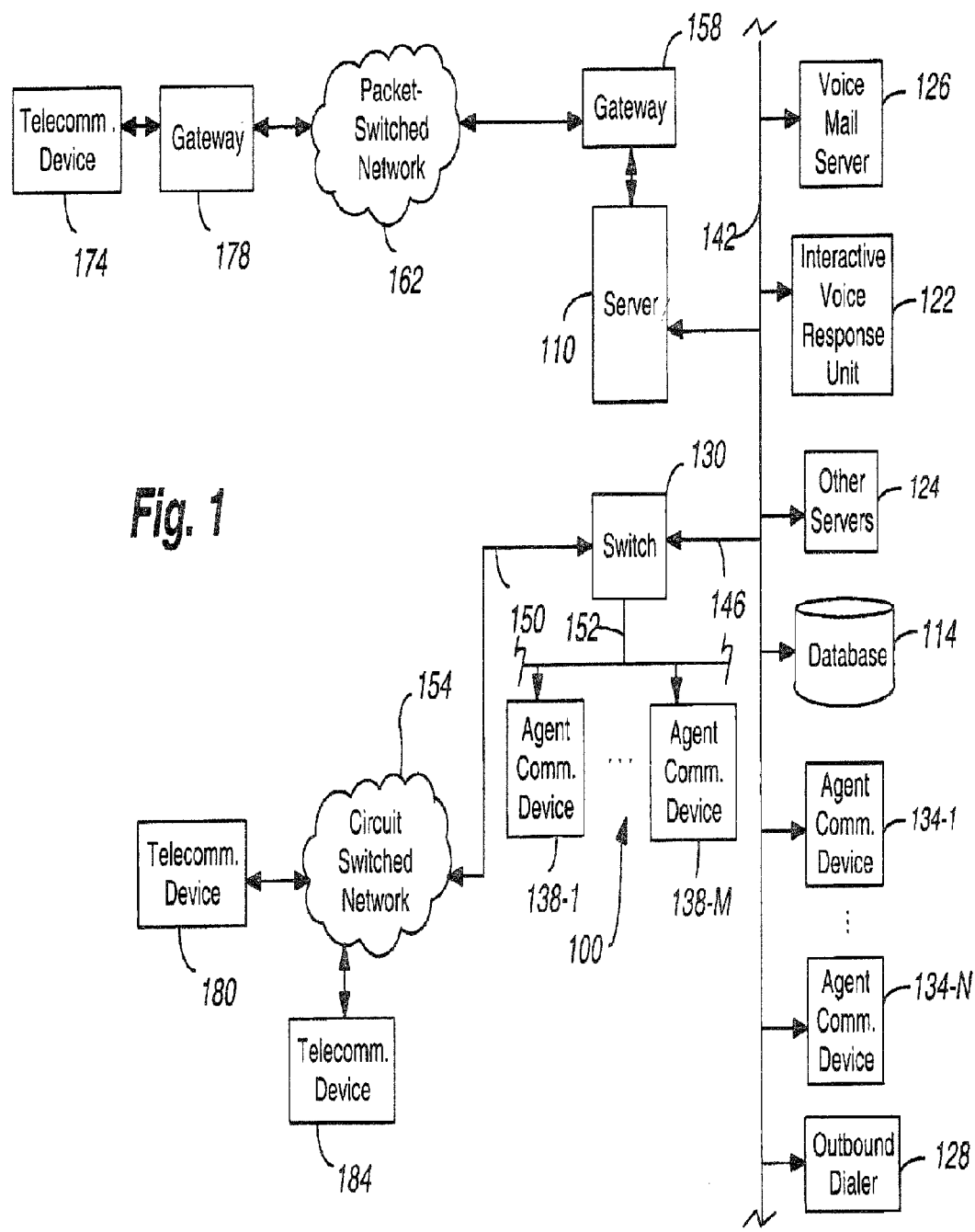
FIG. 1 is a system level block diagram depicting data flow within a contact center in accordance with an embodiment of the present invention.

The headings used herein are for organizational purposes only and are not meant to be used to limit the scope of the description or the claims. As used throughout this application, the word may is used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures Embodiments of the present invention will be illustrated below in conjunction with an exemplary communication system. Although well suited for use with, e.g., a system having an Automated Call Distribution ("ACD"), or other similar work processing switch, the present invention is not limited to use with any particular type of communication system switch or configuration of system elements. Those skilled in the art will recognize that the disclosed techniques may be used in any segmentation or routing system in which it is desirable to simplify manageability and reduce setup time.

DETAILED DESCRIPTION

Embodiments of the present invention generally relate to a method and apparatus for segmenting work in a contact center. More specifically, embodiments of the present invention relate to a method and apparatus for segmenting work in a contact center using skill-based routing.

Although described in the context of a contact center, it is to be understood that this system and method is contemplated and within the scope of embodiments of this invention to be applied to any system where agents are called upon to assist multiple customers at any given time, either simultaneously or substantially simultaneously.

As used herein in connection with embodiments of the present invention, the term "customer" denotes a party external to the contact center irrespective of whether or not that party is a "customer" in the sense of having a commercial relationship with the contact center or with a business represented by the contact center. "Customer" is thus shorthand, as used in contact center terminology, for the other party to a contact or a communications session.

The terms "switch," "server," "contact center server," or "contact center computer server" as used herein should be understood to include a Private Branch Exchange ("PBX"), an ACD, an enterprise switch, or other type of telecommunications system switch or server, as well as other types of processor-based communication control devices such as media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device which sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting an electrical signal.

In the following detailed description, numerous specific details are set forth in order to provide a thorough understanding of exemplary embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

Embodiments of the present invention relate to defining skills using a complex data structure, rather than a single data field or single set of values/variables. The complex data structure may generally be comprised of at least two components: service skills and common skills.

Often, each business service offered by a contact center (e.g., sales, customer service, technical support, and the like) may generally comprise a set of one or more values/variables or options, which may be referred to as the service definition. A "service skill" is a set of acceptable or legal values, one for each value/variable in the service definition.

Common skills, by definition, comprise skill variables independent of a particular service, but necessary for proper communication within a contact center. A common skill may generally be based on a set of values/variables within a common skill definition. For example, language is a common skill variable in multi-language contact centers. Thus, a Spanish-speaking agent speaks Spanish whether the agent is assigned to a Spanish-Sales skill or just a Sales skill.

Common skills may segregate, and separately manage a set of skill variables common across the service skills, the details of which are clarified herein. In many embodiments of the present invention, a system may have the intelligence to assign, for example, Spanish-speaking customer requests to a Spanish-speaking agent without a system manager having to explicitly create the logic to segregate a Spanish speaking caller into either a Spanish queue or an English queue.

In some embodiments of the present invention, a common skill may comprise a language indication, a contact media type indication, or any indication or broad category that may be definable to segment contacts to a particular destination, agent, or group of destinations or agents. In other embodiments, the common skills may automatically manage extra complexity, and rather than having to define specific combinations of legal values for each common skill, the system may manage that automatically.

In certain embodiments, a user may define a common skill set of values/variables (its "definition") and apply that "common skill" definition to a "service skill" definition. Optionally, the system may automatically apply every common skill permutation to every business skill in the service.

As a result, embodiments of the present invention may significantly simplify the usability and manageability of fine grained skills-based routing systems. Allowing the creation of two separate classes of values/variables (i.e., service and common) results in simpler complex segmentation of work in the contact center, and day to day management of agent skill assignments may be easier.

For example, rather than having to place "language" values within each "service skill," "language" may be applied as a common skill across many services. That is, one or more language legal values may be assigned on each agent, so regardless of what language the agent speaks, the agent may speak that language across all business skills where language is important. As another result, a significant amount of custom automated logic process definition can be eliminated because the system may be pre-built to handle segmentation based on common variables, rather than requiring professionals to create that custom logic.

In alternative embodiments, a run-time may match a caller to an agent who can speak the appropriate language and handle the correct request, and such attributes may be classified in at least two ways. For example, a language attribute may be set as a common skill with Spanish and English as legal, i.e., acceptable, values. In addition, the accounts attribute may be defined as a service skill. In accordance with many embodiments of the present invention, the business segmentation object may, for example, define various paths based on each permutation of attribute values of concern.

In accordance with some embodiments of the present invention, the language attribute may not increase the number of skills in the strategy because it may be a common skill. In addition, the application may automatically create permutations as skills in the runtime, but there may be no strategic difference in the way that they are handled. For example, the user may create two branches instead of four, one for new accounts and one for existing accounts. In this example, instead of creating four business rules, each with two attributes and rules (or a rule matching table), the user may only create two rules, with each having one attribute match.

In accordance with some embodiments of the present invention, any common skills may automatically be populated and considered during runtime, as long as the data is available. For example, all users may be configured for the languages they speak (one or more). In addition, all users may also be configured for what service skills they may handle. For example, if a user is capable of speaking English and Spanish, but is only capable of handling existing accounts, the user may get two values assigned to the common language skill and one service skill assigned (i.e., existing accounts).

Embodiments of the present invention may allow administrators to define a class of work segmentation variables that may be commonly used across segments, so that the system may automatically manage the effort involved in defining the work segment permutations (skills) and segmentation logic required to support skills based routing processes.

FIG. 1 is a block diagram depicting a contact center in accordance with an embodiment of the present invention. A contact center 100 generally comprises a central server 110, a set of data stores or databases 114 containing contact or customer related information and other information that can enhance the value and efficiency of the contact, and a plurality of servers, for example, a voice mail server 126, an Interactive Voice Response unit or "IVR" 122, and other servers 124, an outbound dialer 128, a switch 130, a plurality of working agents operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 146 to the switch 130.

As will be appreciated, the other servers 124 can also include a scanner (which is normally not connected to the switch 130 or Web server), VoIP software, video call software, voice messaging software, an IP voice server, a fax server, a web server, an instant messaging server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

Referring again to FIG. 1, the gateway 158 may comprise Avaya Inc.'s, G250™, G350™, G430™, G450™, G650™, G700™, and IG550™ Media Gateways and may be implemented as hardware such as via an adjunct processor (as shown) or as a chip in the server.

The first telecommunication devices 134-1, . . . 134-N are packet-switched device, and may include, for example, IP hardphones, such as the Avaya Inc.'s, 1600™, 4600™, and 5600™ Series IP Phones™; IP softphones, such as Avaya Inc.'s, IP Softphone™; Personal Digital Assistants or PDAs; Personal Computers or PCs, laptops; packet-based H.320 video phones and/or conferencing units; packet-based voice messaging and response units; and packet-based traditional computer telephony adjuncts.

The second telecommunication devices 138-1, . . . 138-M are circuit-switched. Each of the telecommunication devices 138-1, . . . 138-M corresponds to one of a set of internal extensions, for example, Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming calls to and receive outgoing calls from these extensions in a conventional manner.

The second telecommunication devices can include, for example, wired and wireless telephones, PDAs, H.320 video phones and conferencing units, voice messaging and response units, and traditional computer telephony adjuncts. Exemplary digital telecommunication devices include Avaya Inc.'s 2400™, 5400™, and 9600™ Series phones.

It should be noted that embodiments of the present invention does not require any particular type of information transport medium between switch or server and first and second telecommunication devices, i.e., embodiments of the invention may be implemented with any desired type of transport medium as well as combinations of different types of transport media.

The packet-switched network 162 may comprise any data and/or distributed processing network, such as the Internet. The network 162 typically includes proxies (not shown), registrars (not shown), and routers (not shown) for managing packet flows. The packet-switched network 162 is in (wireless or wired) communication with an external first telecommunication device 174 via a gateway 178, and the circuit-switched network 154 with an external (wired) second telecommunication device 180 and (wireless) third (customer) telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In one configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting embodiments of the invention to any particular arrangement of elements.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to route, and then forward the contact to a specific contact center resource, such as the IVR unit 122, the voice mail server 126, the instant messaging server, and/or first or second telecommunication device 134, 138 associated with a selected agent. The server 110 distributes and connects these contacts to telecommunication devices of available agents, based on the predetermined criteria noted above.

When the central server 110 forwards a voice contact to an agent, the central server 110 also forwards customer-related information from databases 114 to the agent's computer work station for viewing (such as by a pop-up display) to permit the agent to better serve the customer. The agents process the contacts sent to them by the central server 110. This embodiment is particularly suited for a Customer Relationship Management (CRM) environment in which customers are permitted to use any media to contact a business. In the CRM environment, both real-time and non-real-time contacts may be handled and distributed with equal efficiency and effectiveness. The server 110 may use a work assignment algorithm that, for example, does not use a queue. In any event, the contact may have associated or "known" contact information. This contact information may include, for example, how long the contact has been waiting, the contact's priority, the contact's media channel, the contact's business value, etc. The contact may be handled based on such known contact information.

The server and/or switch can be a software-controlled system including a processing unit (CPU), microprocessor, or other type of digital data processor executing software or an Application-Specific Integrated Circuit (ASIC) as well as various portions or combinations of such elements. The memory may comprise random access memory (RAM), a read-only memory (ROM), or combinations of these and other types of electronic memory devices. Embodiments of the present invention may be implemented as software, hardware (such as a logic circuit), or a combination thereof.

The contact center 100, in one configuration, includes an automated instant messaging server as another server 124. In such an embodiment, when a customer initiates contact with the contact center 100 using instant messaging, a new instant messaging thread is initiated by the customer. As will be appreciated, instant messages are stand-alone messages, and threading (or associating instant messages with data structures associated with an instant messaging session between a customer and an agent) occurs at the application level. The association is typically effected by pairing an electronic address (e.g., IP address, Media Access Control (MAC) address, telephone number, mobile-device identifier, and the like) of the customer's communication device with an electronic address (e.g., IP address, MAC address, telephone number, mobile-device identifier, and the like) of the agent's communication device in a manner similar to that used for a voice call.

The instant messaging server can be configured to send an automated response, such as "Please wait while I connect you with an agent" and/or to send the instant message to an automated interactive response unit for data collection. The instant messaging server subsequently notifies the server 110 of the existence of a new instant messaging contact, and the server 110 decides whether a suitable (human) agent is available. If an agent is available, the server 110 instructs the instant messaging server to redirect the instant messaging conversation to that available agent's communication device 134-1 . . . N. The server 110 routes, substantially in real-time, subsequent instant messages from the agent's communication device to the customer's communication device and from the customer's communication device to the agent's communication device.

Figure 2:
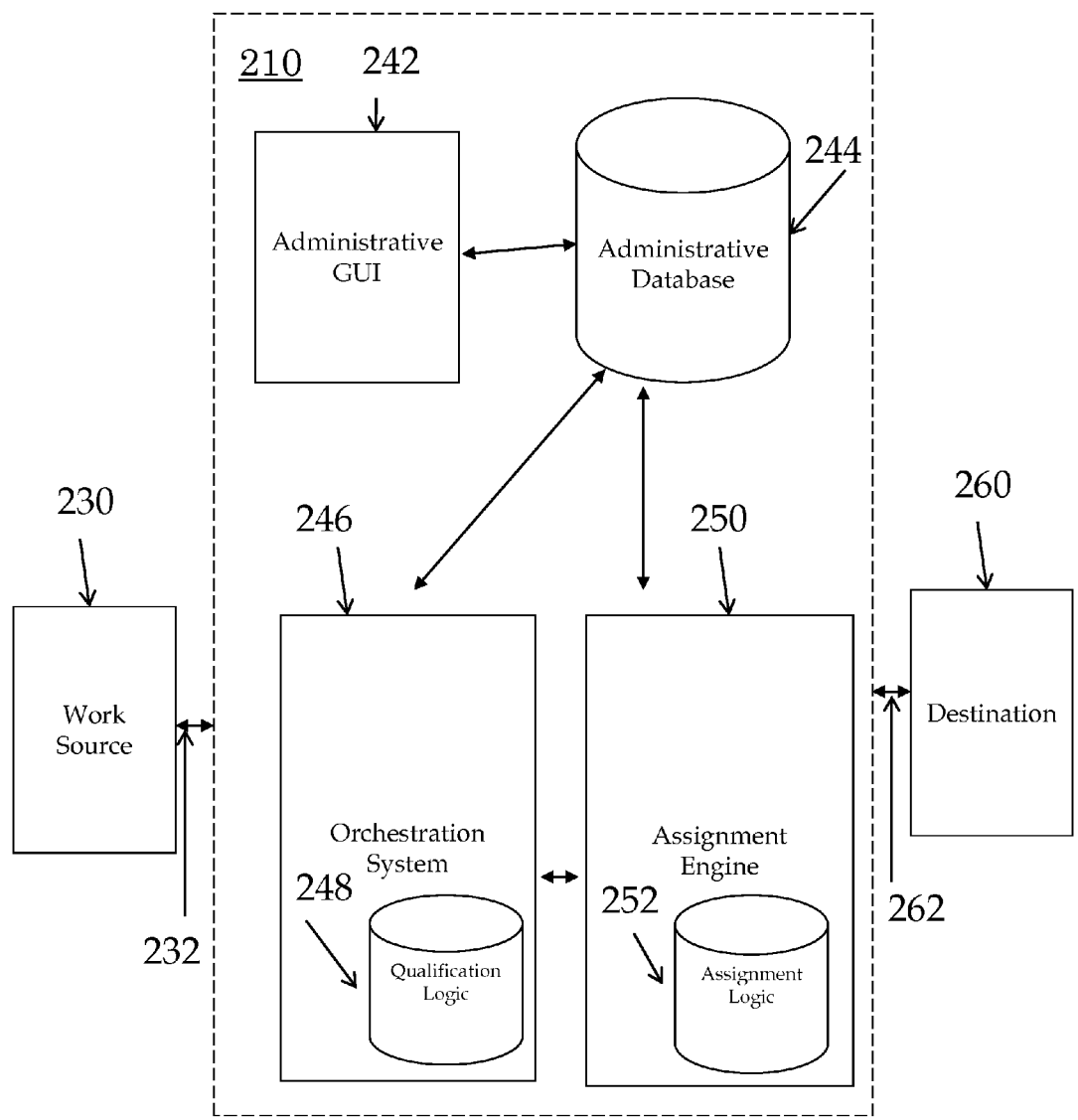
FIG. 2 is a system level block diagram depicting an administrator server in accordance with an embodiment of the present invention.

Referring to FIG. 2, a block diagram depicting a server 210 in accordance with an embodiment of the present invention. The server 210 is in communication with a work source 230, which may comprise customer or any other entity capable of originating a transmission of work or a contact. The server 210 may be configured communication with the work source 230 generally via a work source communication means 232, which may comprise any means of communicating data, for example, one or more trunks, phone lines, wireless connections, Bluetooth connections, digital connections, analog connection, combinations thereof, and the like.

In some embodiments of the present invention, the server 210 may also in communication with a destination 260, which may comprise an agent or any entity capable of receiving a transmission of work or a contact. The server 210 may be configured communication with the destination 260 generally via an agent communication means 262, which may comprise any means of communicating data, for example, a voice-and-data transmission line such as LAN and/or a circuit switched voice line, wireless connections, Bluetooth connections, digital connections, analog connections, combinations thereof, and the like. The server 210 may comprise any type of computer server, for example, a Basic Call Management System ("BCMS") and a Call Management System ("CMS") capable of segmenting work.

The server 210 can be any architecture for directing contacts to one or more telecommunication devices. Illustratively, the server may be a modified in the form of Avaya Inc.'s Definity™ Private-Branch Exchange (PBX)-based ACD system; MultiVantage™ PBX, CRM Central 2000 Server™, Communication Manager™, Business Advocate™, Call Center™, Contact Center Express™, Interaction Center™, and/or 58300™, 58400™, 58500™, and 58700™ servers; or Nortel's Business Communications Manager Intelligent Contact Center™, Contact Center-Express™, Contact Center Manager Server™, Contact Center Portfolio™, and Messaging 100/150 Basic Contact Center™

In many embodiments, the server 210 may be a stored-program-controlled system that conventionally includes, for example, interfaces to external communication links, a communications switching fabric, service circuits (e.g., tone generators, announcement circuits, and the like.), memory for storing control programs and data, and a processor (i.e., a computer) for executing the stored control programs to control the interfaces and the fabric and to provide automatic contact-distribution functionality. The server 210 generally may include a network interface card (not shown) to provide services to the serviced telecommunication devices.

The server 210 may be configured for segmenting work in the contact center and may comprise an administrative database 244 configured to store at least a common skill option and a service skill option; an administrative graphical user interface ("GUI") 242 for accessing at least the administrative database 244 and configuring the common skill option and the service skill option; an orchestration system 246 configured to receive a contact from a work source 230 and orchestrate the contact according to a qualification logic stored in a qualification logic database 248; and an assignment engine 250 configured to receive the contact, the common skill option, and the service skill option, and segment the contact according to an assignment logic stored in an assignment logic database 252. In accordance with some embodiments of the present invention, the qualification logic stored in the qualification logic database 248 and the assignment logic stored in the assignment logic database 252 may comprise any logical set of steps or sequences configured to process data at the call center in accordance with any embodiment of the present invention.

In operation, in accordance with some embodiments of the present invention, a contact center manager, or any system user with security permissions sufficient to access the administrative database 244 (hereinafter "administrator") may input, through the administrative GUI 242 a plurality of common skill options. The administrative database 244 may comprise any database capable of storing data, and may be stored on a contact center computer server. The GUI 242 may comprise any user interface based on graphics (icons and pictures and menus) instead of text, which may utilize a mouse, a keyboard, a touch screen, and the like, or any type of input device.

The common skill options may be personally configured in accordance with many embodiments of the present invention. Generally, each of the common skill options is related to one or more attributes agents and/or other resources have in common or are commonly assigned thereto. The common skill options may be, for example, any or any combination of a language option, a media type option, a training skills option, a certifications option, an education option, a geographic region option. The common skill options may be other options as well.

The language option may be related to different languages the agents and/or other resources are equipped to handle. The media type option may be related to various media types the agents and/or other resources are equipped to handle. The training skills option may be related to various types of training the agents and/or other resources have received, attained, undertaken or attributed thereto. The certifications option may be related to various types of certifications the agents and/or other resources have received, attained, undertaken or attributed thereto. The education option may be related to various types and/or levels of education the agents and/or other resources have received, attained, undertaken or attributed thereto. The geographic region option may be related to geographic regions the agents and/or other resources are equipped to handle.

In accordance with some embodiments of the present invention, the administrator may enter a service skill definition tree. The service skill definition tree may comprise a plurality of service skill options. The service skill definition tree may also include definitions and logical connections between service skill options. These definitions and logical connections may comprise qualification logic and an assignment logic, and are generally configured by the administrator and entered via the GUI 242.

The service skill options may be personally configured in accordance with many embodiments of the present invention. Each of the service skill options may define an instance of the work ("work instance"), and in general, may include a subject of the work instance ("service-skill subject") and an action associated with the work instance ("service-skill action"). The service-skill subject may define, for example, a particular service or product handled by the contact center, and the service-skill action may define one or more business-service offerings offered in connection with such product or service. In some embodiments, the service-skill actions may define the business-service offerings associated with warranty, sales, customer service, returns, collections, promotions and the like, offered in connection with the service-skill subject.

In practice, any of the service skill options may comprise a product or service indication ("product/service indication") for defining the product or service handled by the contact center, and a business-servicing indication for defining the business-service offerings. The business-servicing indication may further define a particular business service department, such as customer service, technical support, and the like, providing the business-servicing offerings.

Both of the service-skill subject and service-skill action may define multiple levels. The multiple levels may, for example, add granularity, variation and/or subdivision for defining the product or service handled by the contact center and/or the business-service offerings. By way of example, the product/service indication may include multiple levels to granularly define a product by product class, product line, product and product variant, such as by laundry products, brand of detergent, detergent with bleach and package size, respectively. Although four levels are described, the product/service indication may have more or less than four levels.

As another example, the business-servicing indication may include multiple levels to define the various business-service offerings associated with warranty support offerings, such as warranty claims, warranty sales, warranty inquiries, etc. Although three levels are described, the business-offering indication may have more or less than three levels.

In other embodiments, the service-skill subject (and in turn, the product/service indication) may include multiple levels to subdivide by product or service and certification(s) required to handle such product or service; and the service-skill action (and in turn, the business-offering indication) may include multiple levels to subdivide by sales and service. Such subdivision may be used, for example, when the particular product or service handled by the contact center has different legal ramifications in different regions and/or jurisdictions.

In other embodiments where, for example, the product or service is regulated by law, rule or otherwise, the service-skill subject and action (and in turn, the product/service and business-offering indications) may include multiple levels to define restrictions based on such regulation. For example, the product/service and business-offering indications may include multiple levels to restrict the agent or other resource from offering one or more of the business-servicing offerings to a citizen of a particular municipality, state, country, etc. unless such agent or other resource is certified in the particular municipality, state, country, etc. These the product/service and business-offering indications may be defined to allow for such restrictions without restricting the agent or other resource from offering the same business-servicing offerings to others in a municipality, state, country, etc. not under such restriction.

Depth and number of subdivisions of the multiple levels may depend on contact center implementation; specific needs of a company for which the contact center is implemented; complexity and/or number of the products or services handled by the contact center; complexity and/or number of the business-service offerings; etc. Also, in alternative embodiments, one or more of the service skill options may comprise a geographic region indication to define a geographical region in which the agent or other resource is to be selected from.

Additionally and/or alternatively, one or more of the service skill options may include any type of indication that can be utilized to segment contacts to a chosen destination, agent or group of destinations or agents. Further, any of the service skill options may be defined to truncate portions of the service skill definition tree and/or to allow for restrictions of one or more particular nodes of the service skill definition tree.

In accordance with some embodiments, the administrator may access the GUI 242 and enter an agent identification for identifying one or more agents. The agent identification may be a variable or any type of unique identifier for identifying an agent and distinguishing the agent from other agents that may access or utilize the contact center. In some embodiments, the administrator may access the GUI 242 and enter all agents employed by a particular company or business unit. An agent may comprise a contact-handling service agent or any other contact-handling agent or entity in accordance with any embodiment of the present invention.

The administrator may access the GUI 242 and enter a common skill option assignment identification that associates an indicated common skill option with the agent identification. The common skill option assignment identification may comprise any variable or data structure that may provide an indication to associate a specific or indicated common skill option or group of common skill options with a specific agent or group of agents.

Similarly, the administrator may access the GUI 242 and enter a service skill option assignment identification that associates an indicated service skill option with the agent identification. In accordance with some embodiments of the present invention, the service skill option assignment identification may comprise any variable or data structure that may provide an indication to associate a specific or indicated service skill option or group of service skill options with a specific agent or group of agents. The indicated common skill option and the indicated service skill option may comprise any common skill option or service skill option, respectively, configured in accordance with embodiments of the present invention that may be selected by a user and subsequently associated with a common skill option assignment identification or a service skill option assignment identification, respectively.

In accordance with some embodiments of the present invention, a contact is received from a work source 230 via the work source communication means 232. The contact may comprise any type of communication in accordance with any embodiment of the present invention. The plurality of common skill options may be transmitted to the work source 230 via the work source communication means 232. The work source 230 may transmit a common skill option selection to the server 210 via the work source communication means 232. The common skill option selection may comprise a common skill selected by a work source, customer, or other entity. In accordance with some embodiments of the present invention, the common skill option selection may be saved on the administrative database 244.

Similarly, the plurality of service skill options may be transmitted to the work source 230 via the work source communication means 232. The service skill option selection may comprise a service skill selected by a work source, customer, or other entity. In accordance with some embodiments of the present invention, the work source 230 may transmit a service skill option selection to the server 210 via the work source communication means 232, and the service skill option selection may be saved on the administrative database 244.

In many embodiments, the received common skill option selection and the received service skill option selection may enter the orchestration system 246 through any portal in accordance with any embodiment of the present invention. In one embodiment, the received common skill option selection and the received service skill option selection may be transmitted to the orchestration system 246 from the administrative database 244. In another embodiment, the received common skill option selection and the received service skill option selection may enter the orchestration system through a voice portal in an IVR context.

The orchestration system 246 may generally comprise any module, for example, a logical sequence or association of steps, processes or components, set of associated routines or subroutines within a computer program, a substantially self-contained hardware device, a logical set of processes, and the like. The orchestration system 246 may perform a contact qualification process in accordance with the qualification logic stored in the qualification logic database 248 and set variables in response to the received common skill option selection and the received service skill option selection. In accordance with some embodiments of the present invention, the orchestration system 246 may transmit the received common skill option selection and the received service skill option selection into the assignment engine 250. The assignment engine 250 may generally comprise any module, for example, a logical sequence or association of steps, processes or components, set of associated routines or subroutines within a computer program, a substantially self-contained hardware device, logical set of processes, and the like.

Generally, the assignment engine 250 may access the assignment logic stored in the assignment logic database 252 and match the common skill and service skills set variables with an agent that can serve the received contact or work. For example, the work assignment process may begin with reading in administrative data, where the process may read in skills from the orchestration system 246 and the associated variables and combinations, as well as common skill and service skill assignments made to a destination 260 or agent.

In accordance with some embodiments of the present invention, following the custom segmentation logic that may assign a contact to a service skill, the system or server 210 may automatically further segment that business skill by values within the common skill variables. For example, once the "sales" service skill is selected for a voice call with a Spanish speaking customer, the system may automatically do further segmentation into a Voice-Spanish-Sales skill without exposing the extra management to a user.

In many embodiments, after the qualification process is performed by the orchestration system 246, the work may be transmitted to the assignment engine 250. The assignment engine 250 may match the work to a destination 260 capable of handling the work in accordance with the assignment logic stored in the assignment logic database 252. In accordance with some embodiments of the present invention, the assignment engine 250 may utilize administrative data received from the administrative database 244 to match the work, once it is qualified by the orchestration system 246, to a destination 260 or agent that is qualified and available. For example, the assignment engine 250 may determine which destination 260 or agent is associated with the appropriate common skills and service skills, and therefore qualified to handle the work. The assignment engine may also determine which destination 260 or agent is available to handle the work. In accordance with some embodiments of the present invention, the work may be delivered to the destination 260 via the agent communication means 262. The destination may be, for example, an agent endpoint, such as a desktop or telephone.

Figure 3:
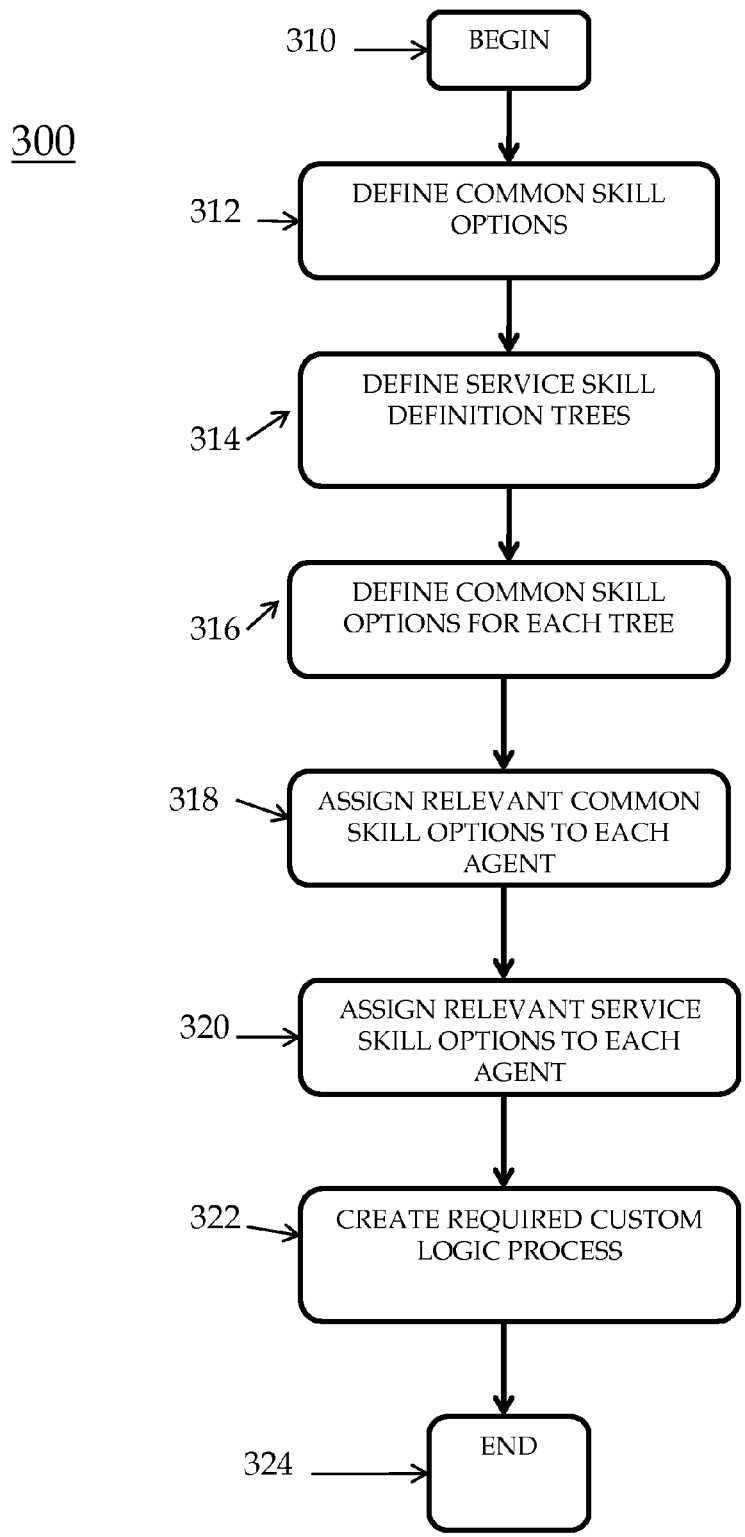
FIG. 3 is a flow chart depicting a method of operation of a contact manager in accordance with an exemplary embodiment of the present invention.

FIG. 3 is a flow chart depicting a method of operation of a contact manager in accordance with an exemplary embodiment of the present invention. The method 300 beings at step 310. At step 312, in accordance with some embodiments of the present invention, the contact center manager may define and configure common skill options or variables. A contact center manager, or any system user with security permissions sufficient to access an administrative database (hereinafter "administrator") may input, through an administrative Graphical User Interface ("GUI") a plurality of common skill options or variables. The common skill options or variables may be configured in accordance with any embodiment of the present invention, including, for example a language option or a media type option.

At step 314, in accordance with some embodiments of the present invention, the administrator may define and configure service skill definition trees and associated service skill options or variables. The service skill definition tree may comprise a plurality of service skill options, and the service skill definition trees may comprise tree structures of legal or acceptable values, wherein each level in the tree is a variable or value. Generally, the service skill definition tree may provide definitions and logical connections between service skill options, including qualification logic and an assignment logic, as configured by the administrator. The service skill options may comprise any type of service skill option suitable for embodiments of the present invention, including, for example, a business service department, such as customer service, technical support, and the like.

At step 316, the common skill options or variables for each tree of service skills may be defined. For example, a common skill option for language and a common skill option for contact media type may be assigned to a set of service skill options grouped together in a service skill definition tree, which may comprise various business service departments such as technical support, sales, customer service, and the like. By assigning common skills to a tree of service skills, the number of configuration permutations necessary may be substantially minimized.

At step 318, relevant common skill options may be assigned to each destination or agent. For example, the administrator may access the GUI and enter an agent identification for identifying one or more agents. The agent identification may be a variable or any type of unique identifier for identifying an agent and distinguishing the agent from other agents that may access or utilize a contact center. The administrator may access the GUI and enter all agents employed by a particular company or business unit. Usually, the agent may comprise contact-handling service agent or any other contact-handling agent or entity in accordance with any embodiment of the present invention.

In accordance with some embodiments of the present invention, the administrator may access the GUI and enter a common skill option assignment identification that associates an indicated common skill option with the agent identification. At step 320, the administrator may assign relevant service skill options to each agent as well. The administrator may access the GUI and enter a service skill option assignment identification that associates an indicated service skill option with an agent identification, similar to the common skill option discussed above.

At step 322, required custom logic processes may be created. In accordance with embodiments of the present invention, a custom logic process may comprise qualification logic, an assignment logic, or any logic process that may determine what skill to place a contact into based on the individual attribute values of the contact. For example, a custom logic process may comprise segmentation logic that may assign a contact to a service skill based on business rules.

In accordance with some embodiments of the present invention, an orchestration system may perform a contact qualification process in accordance with the qualification logic stored in the qualification logic database, and may set variables in response to a received common skill option selection and a received service skill option selection. The orchestration system may transmit the received common skill option selection and the received service skill option selection into an assignment engine. The assignment engine may then access the assignment logic stored in the assignment logic database and match the common skill and service skills variables or values with an agent that can serve the received contact or work. For example, the work assignment process may begin with reading in administrative data, the process may read in skills from the orchestration system and the associated variables and combinations, as well as common skill and service skill assignments made to a destination or agent. At step 324, the process ends and the contact center is configured for receipt of a contact or work.

Figure 4:
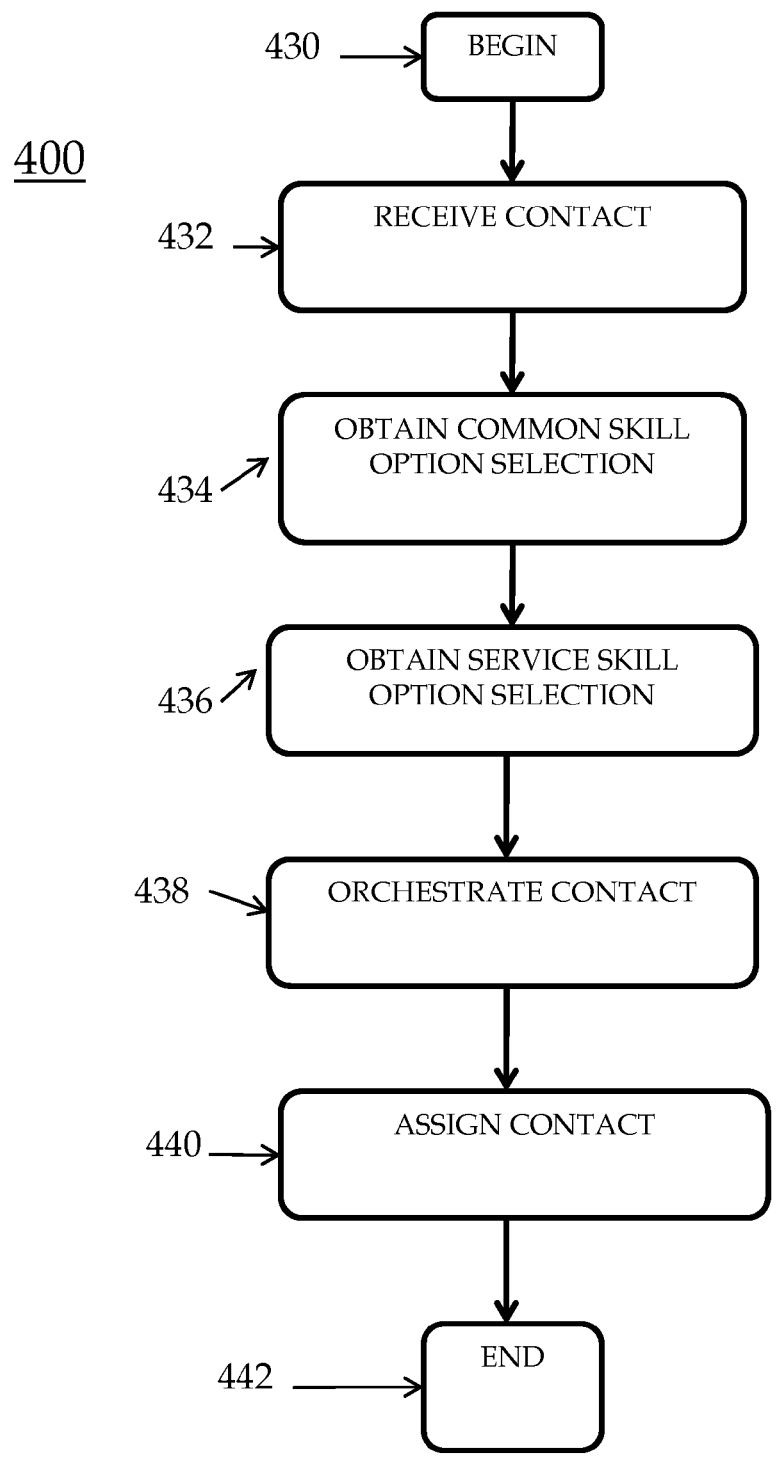
FIG. 4 is a flow chart illustrating a method of segmenting contacts in accordance with one embodiment of the present invention.

FIG. 4 is a flow chart illustrating a method of segmenting contacts in accordance with one embodiment of the present invention. The method 400 begins at step 430. At step 432, a contact is received from a work source via a work source communication means. The contact may comprise any communication configured in accordance with any embodiment of the present invention. For example, the contact may comprise voice communication, data communication, text, instant message, e-mail, fax, any communication format, any combination thereof, and the like.

The work source communication means may comprise any communication means in accordance with any embodiment of the present invention. For example, the work source communication means may comprise telephone lines, trunks, radio frequency (RF) connections, the Internet, wireless connections, Bluetooth connections, modems, cellular phones, digital connections, analog connections, combinations thereof, and the like, and any other method of communication.

At step 434, a common skill option selection may be obtained. The plurality of common skill options may be transmitted to the work source via the work source communication means. In one embodiment, the work source may responsively transmit the common skill option selection to the server via the work source communication means. Alternatively, the server may retrieve the common skill option selection from a database having such selection stored thereon responsive to the work source previously (e.g., at a time prior to the present contact) selecting the common skill option selection from the plurality of common skill options.

The common skill option selection and the common skill options may comprise any common skill option suitable for embodiments of the present invention. For example, the common skill option selection may comprise a transmission format option selection, a language option selection, any combination thereof, and the like, and any possible logical category for segmenting work or contacts.

At step 436, a service skill option selection may be obtained. Similar to the common skill option, a plurality of service skill options may be transmitted to the work source via the work source communication means. The work source may transmit a service skill option selection to the server via the work source communication means. The service skill option selection and the service skill options may comprise any service skill option suitable for embodiments of the present invention, including, for example, a business service offered by a contact center, such as "sales," "customer service," "technical support," any combination thereof, and the like, and any possible logical category for segmenting work or contacts.

At step 438, the contact may be orchestrated. Generally, the received common skill option selection and the received service skill option selection may enter an orchestration system through any portal in accordance with any embodiment of the present invention. For example, the received common skill option selection and the received service skill option selection may enter the orchestration system through a voice portal in an Interactive Voice Response ("IVR") context. The orchestration system may perform a contact qualification process in accordance with a qualification logic defined by an administrator and, the administrator may input the qualification logic and an assignment logic into the administrative database via the GUI. In accordance with some embodiments of the present intention, the qualification logic and assignment logic may then be transmitted to or retrieved by an orchestration system and an assignment engine, respectively.

In some embodiments, the orchestration system may retrieve a common skill selection from the administrative database, and create variables or values in response to the received common skill option selection and the received service skill option selection. The orchestration system may transmit the received common skill option selection and the received service skill option selection into the assignment engine. For example, the work assignment process may begin with reading in administrative data, and the process may read in skills from the orchestration system and the associated variables and combinations, as well as common skill and service skill assignments made to a destination or agent. After the qualification process is performed by the orchestration system, the work may be transmitted to the assignment engine.

At step 440, the contact may be assigned to an agent. The assignment engine may utilize administrative data received from the administrative database to match the work, once it is qualified by the orchestration system, to a destination or agent that is qualified and available. For example, two determinations that may be made by the assignment engine are determining what destination or agent is associated with the appropriate common skills and service skills and therefore qualified to handle the work and determining what destination or agent is available to handle the work.

The assignment engine may access the assignment logic and match the common skill and service skill variables or values with an agent that can serve the received contact or work. The work may be delivered to the destination via the agent communication means. The destination may be, for example, an agent endpoint, such as a desktop or telephone.

It is contemplated within embodiments of the present invention that any type of work may be accepted and segmented to any destination. Embodiments of the present invention are in no way limited to use in a contact center, but may be implemented in any system wherein work is segmented to any destination. At step 442, the method ends.

While referred to herein as work segmentation in a contact center, it is contemplated within embodiments of the present invention that any type of work may be accepted, and then segmented to any destination. Embodiments of the present invention are in no way limited to a specific type of work or contacts, and they are in no way limited to implementation or use in a contact center, but may be implemented in any system wherein any work or contact is segmented to any destination.

While the foregoing is directed to embodiments of the present invention, other and further embodiments of the invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method for segmenting work implemented in a contact center server, comprising:
creating a plurality of common skill options corresponding to one or more agents of a contact center;
wherein the common skill options comprises a media type option, a training skills option, a certifications option, an education option, and a geographic region option;
creating a multiple-level service skill definition tree comprising a plurality of service skill options corresponding to one or more agents of the contact center, wherein each of the plurality of common skill options is associated with the multiple-level service skill definition tree;
associating each of the one or more agents with all common skills and all service skills that each agent is skilled in;
receiving a contact from a customer, wherein the contact comprises a voice communication;
obtaining a common skill option selection, wherein the common skill option selection is selected from the plurality of common skill options by the customer;

wherein obtaining the common skill option selection comprises: retrieving, from a database, the common skill option selection previously selected from the plurality of common skill options by the customer;

transmitting the plurality of service skill options to the customer, and receiving a service skill option selection from the customer, wherein the service skill option selection is selected from the plurality of service skill options, wherein the common skill option comprises at least one attribute common to the agent and at least one other agent; and segmenting the contact to an agent associated with the common skill option selection and service skill option selection, wherein the agent is assigned a common skill legal value and a service skill legal value.

2. The method of claim 1, wherein the agent is associated with at least two of the plurality of common skill options.

3. The method of claim 1, wherein the service skill option defines an instance of work associated with the customer, and wherein the instance of work comprises at least one of a subject of the instance of work and an action associated with the instance of the work.

4. The method of claim 1, wherein obtaining a common skill option selection comprises: transmitting the plurality of common skill options to the customer in response to the contact, and responsively receiving from the customer the common skill option selection selected from the plurality of common skill options.

5. An apparatus for segmenting work in a contact center, comprising:
   an administrative database configured to store a common skill option corresponding to one or more agents of the contact center and a service skill option, selected from a multiple-level service skill definition tree, corresponding to one or more agents of the contact center;
   wherein the common skill options comprises a media type option, a training skills option, a certifications option, an education option, and a geographic region option;
   a graphical user interface (GUI) for accessing the administrative database and configuring the common skill option and the service skill option;
   creating the multiple-level service skill definition tree comprising a plurality of service skill options corresponding to one or more agents of the contact center, wherein each of the plurality of common skill options is associated with the multiple-level service skill definition tree;
   associating each of the one or more agents with all common skills and all service skills that each agent is skilled in;
   an orchestration system configured to receive a contact from a customer and orchestrate the contact according to a qualification logic, wherein the contact comprises a voice communication; and
   an assignment engine configured to: receive the contact, the common skill option, and the service skill option;
   receiving a common skill option selection comprises: retrieving, from the administrative database, the common skill option selection previously selected from the plurality of common skill options by the customer;
   associate each of the one or more agents with all common skills and all service skills that each agent is skilled in, wherein the common skill option comprises at least one attribute common to the agent and at least one other agent; and
   segment the contact to an agent according to an assignment logic, wherein the agent is assigned a common skill legal value and a service skill legal value.

6. The apparatus of claim 5, wherein the administrative database is stored on a contact center computer server.

7. The apparatus of claim 5, wherein the orchestration system comprises a qualification logic database configured to store the qualification logic.

8. The apparatus of claim 5, wherein the assignment engine comprises an assignment logic database configured to store the assignment logic.

9. The apparatus of claim 5, wherein the agent is associated with the common skill option selection and service skill option selection.

10. The apparatus of claim 5, wherein the service skill option defines an instance of work associated with the customer, and wherein the instance of work comprises at least one of a subject of the instance of work and an action associated with the instance of the work.

11. A communication system comprising:
   a gateway configured to receive a contact from a customer, wherein the contact comprises a voice communication;
   an application server configured to receive the contact from the gateway and segment the contact comprising:
   an administrative database configured to store a common skill option corresponding to one or more agents of a contact center and a service skill option, selected from a multiple-level service skill definition tree, corresponding to one or more agents of the contact center;
   wherein the common skill option comprises a media type option, a training skills option, a certifications option, an education option, and a geographic region option;
   a graphical user interface (GUI) for accessing the administrative database and configuring the common skill option and the service skill option;
   creating the multiple-level service skill definition tree comprising a plurality of service skill options corresponding to one or more agents of the contact center, wherein each of the plurality of common skill options is associated with the multiple-level service skill definition tree;
   associating each of the one or more agents with all common skills and all service skills that each agent is skilled in;
   an orchestration system configured to receive the contact from a customer and orchestrate the contact according to a qualification logic; and
   an assignment engine configured to: receive the contact, the common skill option, and the service skill option;
   receiving the common skill option comprises: retrieving, from the administrative database, a common skill option selection previously selected from the plurality of common skill options by the customer;
   associate each of the one or more agents with all common skills and all service skills that each agent is skilled in, wherein the common skill option comprises at least one attribute common to the agent and at least one other agent; and
   segment the contact to an agent according to an assignment logic; and a transmitter for transmitting the contact to a destination, wherein the destination is assigned a common skill legal value and a service skill legal value.

12. The communication system of claim 11, wherein the application server is a contact center computer server.

13. The communication system of claim 11, wherein the orchestration system comprises a qualification logic database configured store the qualification logic.

14. The communication system of claim 11, wherein the assignment engine comprises an assignment logic database configured to store the assignment logic.

15. The communication system of claim 11, wherein the service skill option comprises defines an instance of work associated with the customer, and wherein the instance of work comprises at least one of a subject of the instance of work and an action associated with the instance of the work.

16. The communication system of claim 11, wherein the agent is associated with the common skill option selection and service skill option selection.

\* \* \* \* \*